United States Patent
Lee

(10) Patent No.: US 6,422,973 B2
(45) Date of Patent: Jul. 23, 2002

(54) AUTOMOTIVE ENGINE CONTROL METHOD

(75) Inventor: Se-Yong Lee, Suwon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/752,786

(22) Filed: Dec. 28, 2000

(30) Foreign Application Priority Data

Dec. 30, 1999 (KR) .............................................. 99-66647

(51) Int. Cl.[7] .............................................. B60K 41/04
(52) U.S. Cl. ............................................................ 477/109
(58) Field of Search ................................. 477/107, 109

(56) References Cited

U.S. PATENT DOCUMENTS 5,433,676 A * 7/1995 Abe et al. ................... 477/109
5,478,293 A * 12/1995 Yonezawa ................... 477/110
5,707,317 A * 1/1998 Tabata et al. ................ 477/109

* cited by examiner

*Primary Examiner*—Dirk Wright
(74) *Attorney, Agent, or Firm*—Christie, Parker & Hale, LLP

(57) ABSTRACT

An engine control method for an automotive vehicle includes the steps of gathering and analyzing vehicle condition parameters from a vehicle condition detecting means, determining whether a signal from a TCU is a shift signal or not, converting a throttle opening versus vehicle speed shift line into a engine torque versus vehicle speed shift line, and if the signal from the TCU is a shift signal, determining if a present acceleration pedal displacement value relative to the engine torque is less than a predetermined value, and synchronizing the engine torque to a predetermined value if the acceleration pedal displacement value indicates the engine torque is less than the predetermined value.

3 Claims, 3 Drawing Sheets

AUTOMOTIVE ENGINE CONTROL METHOD

CROSS-REFERENCE TO RELATED APPLICATION

This application claims priority of Korea patent Application No. 99-66647, filed on Dec. 30, 1999.

BACKGROUND OF THE INVENTION (a) Field of the Invention

The present invention relates to an automotive engine control method and, more particularly, to an engine control method for an automatic transmission vehicle equipped with an electric throttle control (ETC) device for reducing shift shocks, in which engine torque of each speed range relative to the acceleration pedal displacement is calculated and the throttle is adjusted such that the engine torque is guided by a formulated line.

(b) Description of the Related Art

Typically, an automatic transmission vehicle equipped with an ETC device performs a speed range shift control by a shift pattern predetermined in accordance with vehicle speed and throttle opening.

In this case, to reduce shift impact generated during a speed range shift, shift control means sends a combined control signal to an engine control means so as to degrade engine torque.

However, this engine control mechanism has drawbacks in that value of engine torque is calculated at every shift range for compensating a torque displacement during the shift operation, and the engine torque reduction according to the combination control deteriorates engine performance and fuel consumption.

SUMMARY OF THE INVENTION

The present invention has been made in an effort to solve the above problems of the prior art.

It is an object of the present invention to provide an engine control method for an automatic transmission vehicle equipped with an electric throttle control (ETC) device for reducing shift shocks, in which engine torque of each speed range relative to the acceleration pedal displacement is calculated and the throttle opening is adjusted such that the engine torque is guided along the formulated line during speed range shift.

To achieve the above object, the engine control method for an automotive vehicle of the present invention comprises the steps of gathering and analyzing vehicle condition parameters from a vehicle condition detecting means, determining whether a signal from a TCU is a shift signal or not, converting a throttle opening versus vehicle speed shift line into an engine torque versus vehicle speed shift line, and if the signal from the TCU is a shift signal, determining if a present acceleration pedal displacement value relative to the engine torque is less than a predetermined value, and synchronizing the engine torque to a predetermined value if the acceleration pedal displacement value indicates the engine torque is less than the predetermined value.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

A preferred embodiment of the present invention will be described hereinafter with reference to the accompanying drawings.

Figure 1:
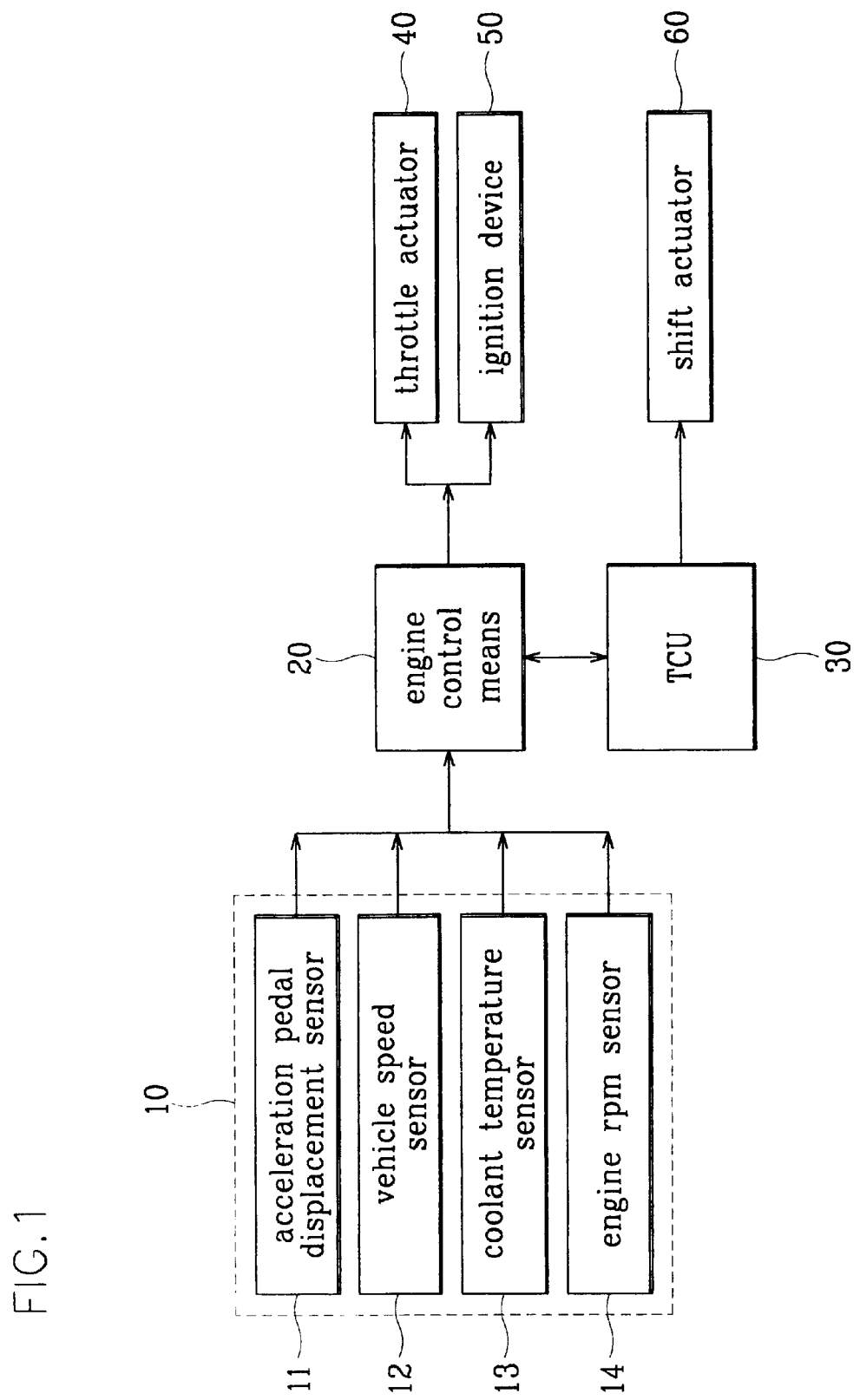
FIG. 1 is a block diagram of an automotive engine control device according to a preferred embodiment of the present invention.

As shown in FIG. 1, an automotive engine control device comprises vehicle condition detecting means 10 including an acceleration pedal displacement sensor 11, a vehicle speed sensor 12, a coolant temperature sensor 13, and an engine rpm sensor 14; engine control means 20 receiving vehicle condition signals from the vehicle condition detecting means 10, setting engine torque corresponding to each speed range according to the acceleration pedal displacement if the condition signal is a shift signal, producing a control signal for varying the throttle opening to an upshift opening according to a acceleration pedal displacement if the condition shift signal is an upshift signal, and producing a shift permission signal; a transmission control means (TCU) 30 for producing and sending a shift signal to the engine control means 20 if shift control is determined, and producing and sending a control signal for shifting the speed range to a target speed range if receiving a shift signal from the engine control means 10; a throttle actuator 40 for adjusting the throttle opening level on the basis of the control signal from the engine control means 20; an ignition device 50 for adjusting the ignition timing on the basis of the control signal from the engine control means 20; and a shift operation actuator 60 for synchronizing a speed range to a target speed range on the basis of the control signal from the shift control means 30.

Figure 2:
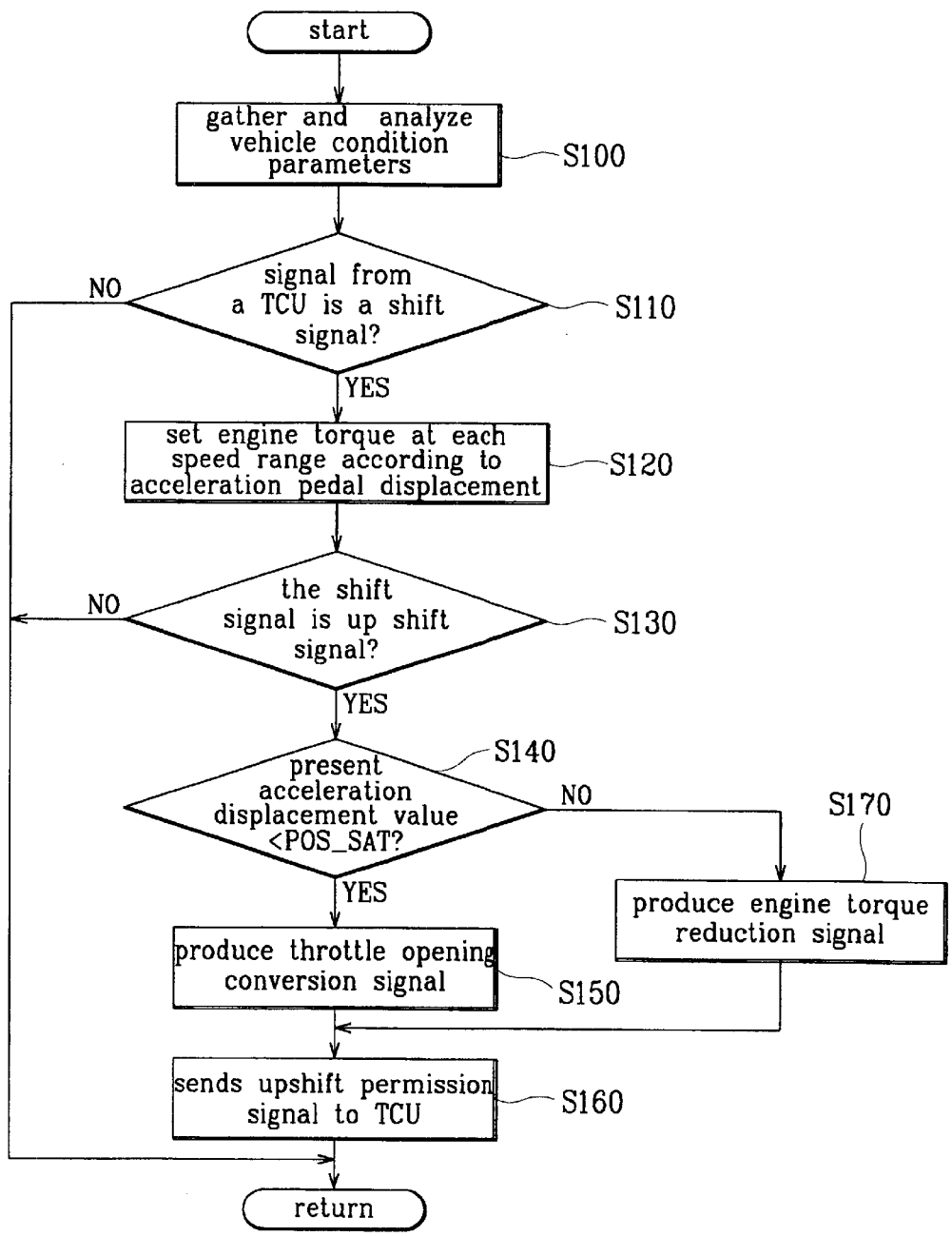
FIG. 2 is a flowchart showing an automotive engine control method according to the preferred embodiment of the present invention.

The automotive engine control method of the above structured engine control device will be described hereinafter with reference to FIG. 2, FIG. 3a, and FIG. 3b.

In the automatic transmission vehicle of the present invention, the shift line formed as a vehicle speed versus throttle opening function is converted into a vehicle speed versus engine torque line such that the continuous throttle opening value is mapped to the continuous engine torque value in the same shift line. Accordingly, the throttle opening is determined by the engine torque relative to the acceleration pedal displacement.

The continuous throttle opening at each speed range is measured and recorded in a memory, and a point where the driving torque TOQ is not changing regardless of the acceleration pedal displacement increase is set as a value POS_SAT.

After the driving torque TOQ is fixed at POS_SAT, engine torque values are measured at each speed range so as to be recorded as mapping values TOQ_STs and a correlation between the acceleration pedal displacement and the engine torque is calculated and recorded.

All the values measured through several sequences are set in a memory of the engine control means 20.

During engine operation, the engine control means 20 with a preset engine control program produces and sends a signal to the vehicle condition detecting means 10 and then the vehicle condition detecting means 10 responsively sends back a response signal on the basis of parameters from the acceleration pedal displacement, vehicle speed, coolant temperature, and engine rpm detected by the acceleration pedal displacement sensor 11, vehicle speed sensor 12, coolant temperature sensor 13, and engine rpm sensor 14 in step S100.

After receiving the response signal from the vehicle condition detecting means 10, the engine control means 20 analyzes the response signal and records the same in the memory, and if receiving a signal from the TCU 30, the engine control means 20 determines whether the signal from the TCU 30 is a shift signal or not in step S110.

Figure 3:
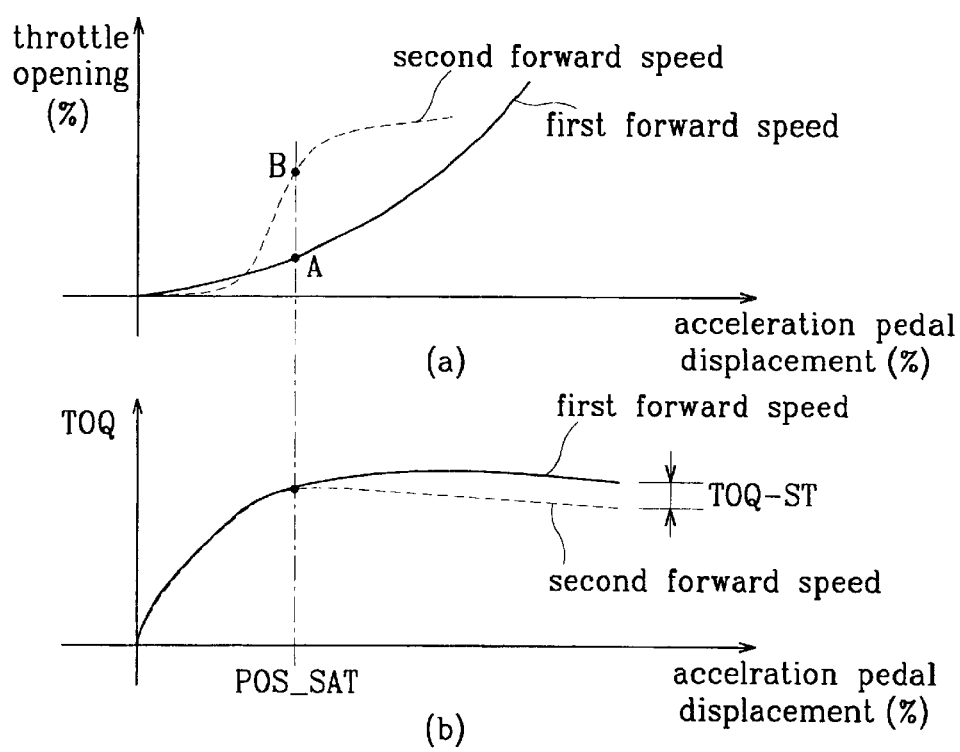
FIG. 3a is a graph showing throttle opening variation according to acceleration pedal displacement in the automotive engine control method of FIG. 2.
FIG. 3b is a graph showing engine torque variation according to acceleration pedal displacement in the automotive engine control method of FIG. 2.

If the signal from the TCU 30 is a shift signal, the engine control means 20 maps the engine torque relative to the acceleration pedal displacement at respective speed ranges to the preset values in step S120 (see FIG. 3a).

After the mapping is complete, the engine control means 20 determines whether the shift signal is an upshift signal or not in step S130.

If the shift signal from the TCU 30 is the upshift signal, the engine control means 20 determines if the acceleration pedal displacement value detected by the acceleration pedal displacement sensor 11 of the vehicle condition detecting means 10 is less than the value POS_SAT in step 140.

If the acceleration pedal value is less than POS_SAT, the engine control means 20 converts the throttle opening of the first forward speed into the throttle opening of the second forward speed and then sends a throttle opening signal to the throttle actuator 40 in step S150.

The throttle actuator 40 is operated in accordance with the throttle opening signal from the engine control means 20 so as to adjust the throttle opening.

Consequently, the engine control means 20 sends an upshift permission signal to the TCU 30 and returns to a main routine in step S160.

The TCU 30 produces and sends a shift control signal to the shift actuator 60 for shifting up the shift range on the basis of the upshift permission signal from the engine control means 20.

The shift actuator 60 is operated according to the shift control signal from the TCU 30 such that the first speed range is converted into the second speed range.

However, if the acceleration pedal displacement value is not less than the value POS_SAT, the engine control means 20 determines that the engine torque is greater than a required torque at the corresponding speed range, so it produces and sends a ignition control signal to the ignition device 50 according to the preset mapping table (TOQ_ST) in step S170 to reduce engine torque, and subsequently sends an upshift permission signal to the TCU 30 in step S160.

As described above, in the engine control method of the present invention, engine torque at each speed range relative to the acceleration pedal displacement is calculated and the throttle opening is adjusted such that the engine torque is guided by the formulated line while shifting speed range, resulting in a reduction of shift shock.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. An engine control method for an automotive vehicle comprising the steps of:
    gathering and analyzing vehicle condition parameters from a vehicle condition detecting means;
    determining whether a signal from a TCU is a shift signal or not;
    converting a throttle opening versus vehicle speed shift line into an engine torque versus vehicle speed shift line, if the signal from the TCU is a shift signal;
    determining if a present acceleration pedal displacement value relative to the engine torque is less than a predetermined value; and
    synchronizing the engine torque to a predetermined value if the acceleration pedal displacement value indicates the engine torque is less than the predetermined value.

2. An engine control method of claim 1 wherein if the present acceleration pedal displacement value is greater than the predetermined value, an engine torque reduction signal is produced by an engine control means.

3. An engine control device for an automotive vehicle comprises:
    vehicle condition detecting means for detecting vehicle conditions including acceleration pedal displacement, vehicle speed, a coolant engine rpm;
    engine control means which receives vehicle condition signals from the vehicle condition detecting means, sets engine torque corresponding to each speed range according to the acceleration pedal displacement if the condition signal is a shift signal, producing a control signal for varying the throttle opening to an upshift opening according to a acceleration pedal displacement if the condition shift signal is an upshift signal, and producing a shift permission signal;
    transmission control means for producing and sending a shift signal to the engine control means if shift control is determined, and producing and sending a control signal for shifting the speed range to a target speed range if receiving a shift signal from the engine control means;
    a throttle actuator for adjusting the throttle opening level on the basis of the control signal from the engine control means;
    an ignition device for adjusting the ignition timing on the basis of the control signal from the engine control means; and
    a shift operation actuator for synchronizing a speed range to a target speed range on the basis of the control signal from the shift control means.

* * * * *

UNITED STATES PATENT AND TRADEMARK OFFICE
CERTIFICATE OF CORRECTION

PATENT NO.      : 6,422,973 B2
DATED           : July 23, 2002
INVENTOR(S)     : Se-Yong Lee It is certified that error appears in the above-identified patent and that said Letters Patent is hereby corrected as shown below:

Column 4,
Line 35, replace "coolant engine rpm;" with -- coolant temperature, and engine rpm --

Signed and Sealed this

Second Day of September, 2003

JAMES E. ROGAN
*Director of the United States Patent and Trademark Office*